United States Patent [19]
Flynn et al.

[11] Patent Number: 6,068,910
[45] Date of Patent: May 30, 2000

[54] POLYESTER RESIN COMPOSITIONS FOR CALENDERING

[75] Inventors: Paul Mary Flynn; Richard Leon McConnell, both of Kingsport, Tenn.; Hubertus Jacobus Wilhelmus Moolenaar, Dordrecht, Netherlands; Timothy Michael Sanders, Kingsport, Tenn.

[73] Assignee: Eastman Chemical Company, Kingsport, Tenn.

[21] Appl. No.: 09/258,365

[22] Filed: Feb. 26, 1999

Related U.S. Application Data
[60] Provisional application No. 60/078,290, Mar. 17, 1998.

[51] Int. Cl.[7] .............................. B32B 3/10; B29C 49/08; C08G 63/02
[52] U.S. Cl. ...................... 428/141; 528/272; 528/298; 528/301; 528/302; 528/307; 528/308; 528/308.6; 524/81; 524/186; 524/270; 524/275; 524/277; 524/284; 428/143; 428/147; 428/148; 264/288.4; 264/292; 264/300
[58] Field of Search .................................. 528/272, 298, 528/301, 302, 307, 308, 308.6; 524/81, 186, 270, 275, 277, 284; 428/141, 143, 147, 148; 264/288.4, 292, 300

[56] References Cited

U.S. PATENT DOCUMENTS
5,654,347  8/1997  Khemani et al. .
5,696,176  12/1997  Khemani et al. .

FOREIGN PATENT DOCUMENTS
0 724 947 A1  8/1996  European Pat. Off. .
0 744 439 A1  11/1996  European Pat. Off. .
7-197213  2/1997  Japan .

OTHER PUBLICATIONS
Jim Butschli, *Packaging World*, p. 26–28, Jun. 1997.
W.V. Titow, *PVC Technology*, $4^{th}$ Edition, pp. 803–848 (1984), Elsevier Publishing Co.
Database WPI, Section CH, Week 9702, XP–002106151, Derwent Publications Ltd., Oct. 29, 1996, London, GB.
*Patent Abstracts of Japan*, Feb. 29, 1996, vol. 096, No. 002 (JP 07 278418 A, Oct. 24, 1995).

*Primary Examiner*—Samuel A. Acquah
*Attorney, Agent, or Firm*—Cheryl J. Tubach; Harry J. Gwinnell

[57] ABSTRACT

A polyester resin composition is calendered to produce a film or a sheet. The polyester resin composition is a polyester having a crystallization half time from a molten state of at least 5 minutes combined with an additive for preventing sticking of the polyester to calendering rolls.

32 Claims, 5 Drawing Sheets

POLYESTER RESIN COMPOSITIONS FOR CALENDERING

CROSS REFERENCES TO RELATED APPLICATIONS

This application claims the benefit of U.S. Provisional Application Serial No. 60/078,290 filed Mar. 17, 1998.

TECHNICAL FIELD OF THE INVENTION

This invention relates to the manufacture of film and sheet utilizing calendering processes, and more particularly to the use of polyesters in such calendering processes.

BACKGROUND OF THE INVENTION

Calendering is an economic and highly efficient means to produce film and sheet from plastics such as plasticized and rigid poly (vinyl chloride) (PVC) compositions. The films and sheets usually have a thickness ranging from about 2 mils (0.05 mm) to about 45 mils (1.14 mm). They are readily thermoformed into various shapes and are used for a wide variety of packaging applications. Calendered PVC film or sheet can be used in a wide range of applications including pool liners, graphic arts, transaction cards, security cards, veneers, wall coverings, book bindings, folders, floor tiles and products which are printed or decorated or laminated in a secondary operation.

Japan Application No. Heisei 7-197213 (1995) to E. Nishimura et al. and European Patent Application 0 744 439 A1 (1996) to Y. Azuma et al. disclose the state of the art with regard to polypropylene resin compositions used in calendering processes.

In a typical calendering process line, the plastic resin is blended with specific ingredients such as stabilizers to prevent thermal degradation; modifiers for clarity, heat stability or opacity characteristics; pigments; lubricants and processing aids; anti-static agents; UV inhibitors; and flame retardants. The mixed ingredients are plasticized in a kneader or extruder. Through heat, shear and pressure, the dry powders are fused to form a homogeneous, molten material. The extruder feeds the molten material in a continuous process to the top of the calendering section of the calendering line in between first and second heated calender rolls. Typically, four rolls are used to form three nips or gaps. The rolls are configured in an "L" shape or an inverted "L" shape. The rolls vary in size to accommodate different film widths. The rolls have separate temperature and speed controls. The material proceeds through the nip between the first two rolls, referred to as the feed nip. The rolls rotate in opposite directions to help spread the material across the width of the rolls. The material winds between the first and second, second and third, third and fourth rolls, etc. The gap between rolls decreases in thickness between each of the rolls so that the material is thinned between the sets of rolls as it proceeds. After passing through the calender section, the material moves through another series of rolls where it is stretched and gradually cooled forming a film or sheet. The cooled material is then wound into master rolls. General descriptions of calendering processes are disclosed in Jim Butschli, *Packaging World*, p. 26–28, June 1997 and W. V. Titow, *PVC Technology*, 4$^{th}$ Edition, pp 803–848 (1984), Elsevier Publishing Co., both incorporated herein by reference.

Although PVC compositions are by far the largest segment of the calendered film and sheet business, small amounts of other thermoplastic polymers such as thermoplastic rubbers, certain polyurethanes, talc-filled polypropylene, acrylonitrile/butadiene/styrene terpolymers (ABS resins) and chlorinated polyethylene are sometimes processed by calendering methods. Attempts to calender polyester polymers such as poly(ethylene terephthalate) (PET) or poly(1,4-butylene terephthalate) (PBT) have not been successful. For example, PET polymers with inherent viscosity values of about 0.6 dL/g have insufficient melt strength to perform properly on the calendering rolls. Also when the polyester is fed to the rolls at typical processing temperatures of 160° C. to 180° C., the PET polymer crystallizes causing a non-homogeneous mass which is unsuitable for further processing. The non-homogeneous mass causes undesirable high forces on the calender bearings. The tendency of polyester polymers to hydrolyze during processing in the molten or semi-molten state on rolls open to ambient conditions is also a concern. Typical PET polymers without the inclusion of process lubricants or internal release additives, also have a tendency to stick to the calendering rolls at typical processing temperatures.

Conventional processing of polyesters into film or sheet involves extruding a polyester melt through a manifold of a flat die. Manual or automatic die lip adjustment is used to control thickness across a web of material. Water-cooled chill rolls are used to quench the molten web and impart a smooth surface finish. A typical die extrusion process is shown in FIGS. 2A and 2B. Extrusion processes while producing film and sheet of excellent quality do not have the throughput and economic advantages that are provided by calendering processes.

Thus, there exists a need in the art for an efficient and economic process to manufacture polyester films and sheets as an alternative to extrusion processes. Accordingly, it is to the provision of such that the present invention is primarily directed.

SUMMARY OF THE INVENTION

A polyester resin composition for calendering comprises a polyester having a crystallization half time from a molten state of at least 5 minutes and an additive for preventing sticking of the polyester to calendering rolls. In another embodiment of the invention, a process for preparing a film or a sheet comprises the step of calendering such polyester resin composition.

DETAILED DESCRIPTION OF THE INVENTION

Figure 1:
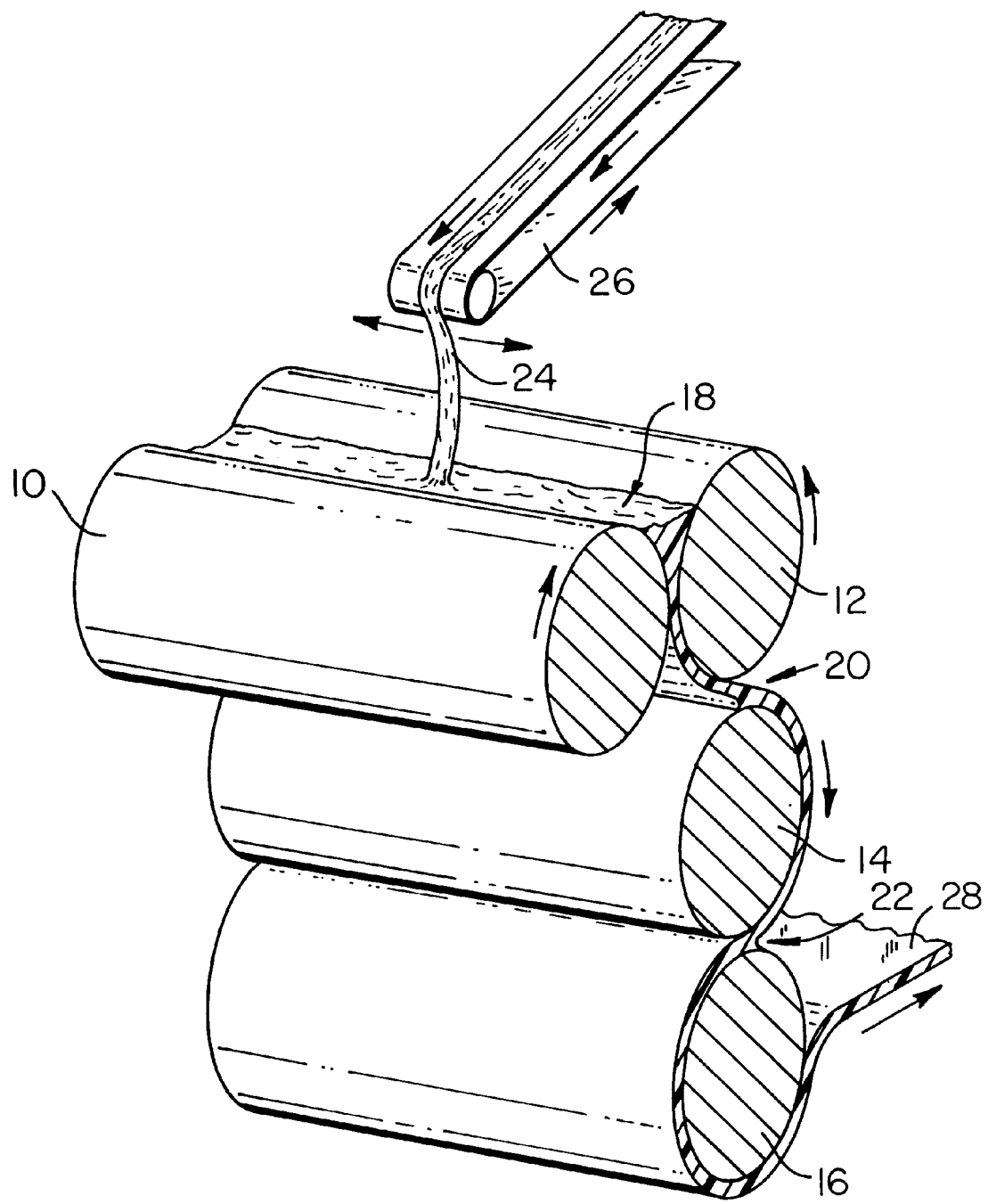
FIG. 1 is a schematic of the polyester calendering process of the present invention.

Certain amorphous or semi-crystalline polyester resin compositions are unexpectedly capable of being calendered using conventional calendering processes to produce uniform films and sheets. The polyester resin compositions comprise a polyester having a crystallization half time from a molten state of about 5 minutes and an additive for preventing sticking to calendering rolls. The films and sheets typically have a thickness in the range of about 2 mils (0.05 mm) to about 80 mils (2 mm).

Polyesters useful in the practice of this invention include polyesters having a crystallization half time from a molten state of at least about 5 minutes, preferably about 12 minutes. The term "polyesters" as used herein is meant to include copolyesters. Amorphous polyesters are preferred because of their having a crystallization half time of infinity. Desired crystallization kinetics from the melt may also be achieved by adding polymeric additives or by altering the molecular weight characteristics of the polymer. An especially useful technique is to blend amorphous or very slow crystallizing polyester with the base polyester.

Crystallization half times as defined by the present invention are measured using a Perkin-Elmer Model DSC-2 differential scanning calorimeter. Each sample of 15.0 mg is sealed in an aluminum pan and heated to 290° C. at a rate of about 320° C./min for 2 minutes. The sample is then cooled immediately to the predetermined isothermal crystallization temperature at a rate of about 320° C./minute in the presence of helium. The crystallization half time is determined as the time span from reaching the isothermal crystallization temperature to the point of a crystallization peak on the DSC curve.

Preferred polyesters comprise (i) at least 80 mole percent of a diacid residue component selected from terephthalic acid, naphthalenedicarboxylic acid, 1,4-cyclohexanedicarboxylic acid, isophthalic acid or mixtures thereof and (ii) at least 80 mole percent of a diol residue component selected from diols containing 2 to about 10 carbon atoms and mixtures thereof. The diacid residue component is based on 100 mole percent, and the diol residue component is based on 100 mole percent.

For the diacid residue component, any of the various isomers of naphthalenedicarboxylic acid or mixtures of isomers may be used, but the 1,4, 1,5-, 2,6-, and 2,7-isomers are preferred. Also, cis, trans, or cis/trans isomer mixtures of 1,4-cyclohexanedicarboxylic acid may be used. Sulfoisophthalic acid may also be used. The diacid residue component may be modified with minor amounts of up to about 20 mole percent of other diacids containing about 4 to about 40 carbon atoms and include succinic acid, glutaric acid, azelaic acid, adipic acid, suberic acid, sebacic acid, dimer acid and the like.

For the diol residue component, the preferred diols include ethylene glycol, diethylene glycol, neopentyl glycol, 1,4-cyclohexanedimethanol and mixtures thereof. More preferably, the diol residue component is from about 10 to 100 mole percent 1,4-cyclohexanedimethanol and from about 90 to 0 mole percent ethylene glycol. The diol residue component may also be modified with up to about 20 mole percent of other diols. Suitable modifying diols include 1,3-propanediol, 1,4-butanediol, 1,5-pentanediol, 1,6-hexanediol, 1,8-octanediol, 2,2,4-trimethyl-1,3-pentanediol, propylene glycol, 2,2,4,4-tetramethyl-1,3-cyclobutanediol and the like.

The inherent viscosity (I.V.) of useful polyesters generally range from about 0.4 to about 1.5 dL/g, preferably about 0.6 to about 12 dL/g. I.V. as used herein refers to inherent viscosity determinations made at 25° C. using 0.25 gram of polymer per 100 mL of a solvent composed of 60 weight percent phenol and 40 weight percent tetrachloroethane.

The amorphous polyesters are made by melt phase techniques well known in the art. The semicrystalline polyesters may be made by a combination of melt phase and solid phase poly-condensation procedures also well known in the art.

In addition to the polyester, the polyester resin composition for calendering also includes an additive that prevents the polyester from sticking to the calendering rolls. The amount of additive used in the polyester resin composition is typically about 0.01 to 10 weight percent based on the total weight percent of the polyester resin composition. The optimum amount of additive used is determined by factors well known in the art and considers variations in equipment, material, process conditions, and material film thickness.

Additives suitable for use in the present invention are well known in the calendering art and include internal lubricants, slip agents or mixtures thereof. Examples of such additives include fatty acid amides such as erucylamide and stearamide; metal salts of organic acids such as calcium stearate and zinc stearate; fatty acids and esters such as stearic acid, oleic acid, and palmitic acid; hydrocarbon waxes such as paraffin wax, polyethylene waxes, and polypropylene waxes; chemically modified polyolefin waxes; ester waxes such as carnauba; glycerol mono- and di-stearates; talc; and acrylic copolymers (for example, PARALOID K175 available from Rohm & Haas). Antiblock and denest aids such as microcrystalline silica and erucylamide are also frequently used.

Conventional oxidative stabilizers may also be used with polyesters of the present invention to prevent oxidative degradation during processing of the molten or semi-molten material on the rolls. Suitable stabilizers include esters such as distearyl thiodipropionate or dilauryl thiodipropionate; phenolic stabilizers such as IRGANOX 1010 available from Ciba-Geigy AG, ETHANOX 330 available from Ethyl Corporation, and butylated hydroxytoluene; and phosphorus containing stabilizers such as IRGAFOS available from Ciba-Geigy AG and WESTON stabilizers available from GE Specialty Chemicals. These stabilizers may be used alone or in combinations.

Sometimes the melt viscosity and the melt strength of the polyester are insufficient for suitable processing on the calendering equipment. In these cases, the use of a melt strength enhancer is desirable such as by the addition of small amounts (about 0.1 to about 2.0 mole %) of a branching agent to the polyesters either during their initial preparation or during subsequent blending or feeding procedures prior to reaching the calendering equipment. Suitable branching agents include multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. These branching agents may be added directly to the polyester or blended with the polyester in the form of a concentrate as described in U.S. Pat. No. 5,654,347 and U.S. Pat. No. 5,696,176. It is also possible to use agents such as sulfoisophthalic acid to increase the melt strength of the polyester to a desirable level.

In addition to the additives described above, other additives typically used with polymers may be used as desired. These include plasticizers, dyes, colorants, pigments, fillers, matting agents, antiblocking agents, antistatic agents, chopped fibers, glass, impact modifiers, flame retardants, carbon black, talc, $TiO_2$ and the like.

In another embodiment of the present invention, a process for preparing a film or sheet comprises the step of calendering the polyester resin composition described above. Conventional calendering processes and equipment are utilized to calender the polyester resin composition. Calenders having at least two adjacent heated rolls are suitable for processing the polyester resin composition, which is introduced between the two rolls in pellet, powder or molten form. The rolls may be in series or have a "L", an inverted "L", or a "Z" configuration. Typical processing temperatures for the rolls will generally range from about 130° C. to about 250° C., preferably about 140° C. to about 190° C. Predrying the polyester resin composition or venting excess moisture during processing is preferred to prevent polymer degradation by hydrolysis.

With reference to FIG. 1, an inverted "L" configuration is used for the four heated rolls 10, 12, 14, and 16. The four rolls form three compressive nips or gaps. A feed nip 18 is formed between the first roll 10 and second roll 12. A metering nip 20 is formed between the second roll 12 and the third roll 14. A finishing nip 22 is formed between the third roll 14 and the fourth roll 16. A hot strip or rod 24 of the molten polyester resin composition is uniformly fed by a pivot mounted feeding device 26 into the feed nip 18. The molten composition is preferably a homogeneous material as it exits the compounding or extruding operation (not shown). The molten composition may be further mixed and heated by the circulating melt bank formed at the feed nip 18. The molten composition is eventually forced between the first roll 10 and the second roll 12 by the rotating action of the rolls, then forced through the metering nip 22 for reduction to its final desired thickness, and finally forced through the finishing nip 22 to form a film or sheet 28 of a particular gauge.

The resulting film or sheet 28 made from the polyester resin composition of the present invention has a uniform thickness that is produced by passing the polyester resin composition through the compressive nips between the heated rolls. In effect, the polyester resin composition is squeezed between the nips which separates the rolls. Each successive nip between the calendering rolls reduces in opening size to obtain the final film or sheet gauge.

Figure 2B:
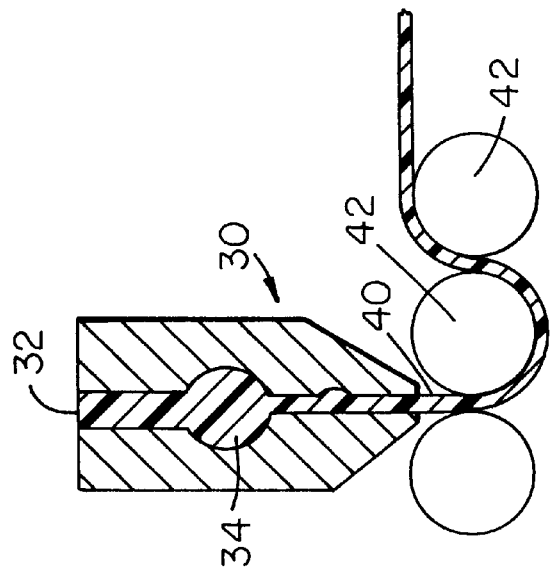
FIG. 2B is a schematic of a portion of the prior art extrusion process for polyester film.
Figure 2A:
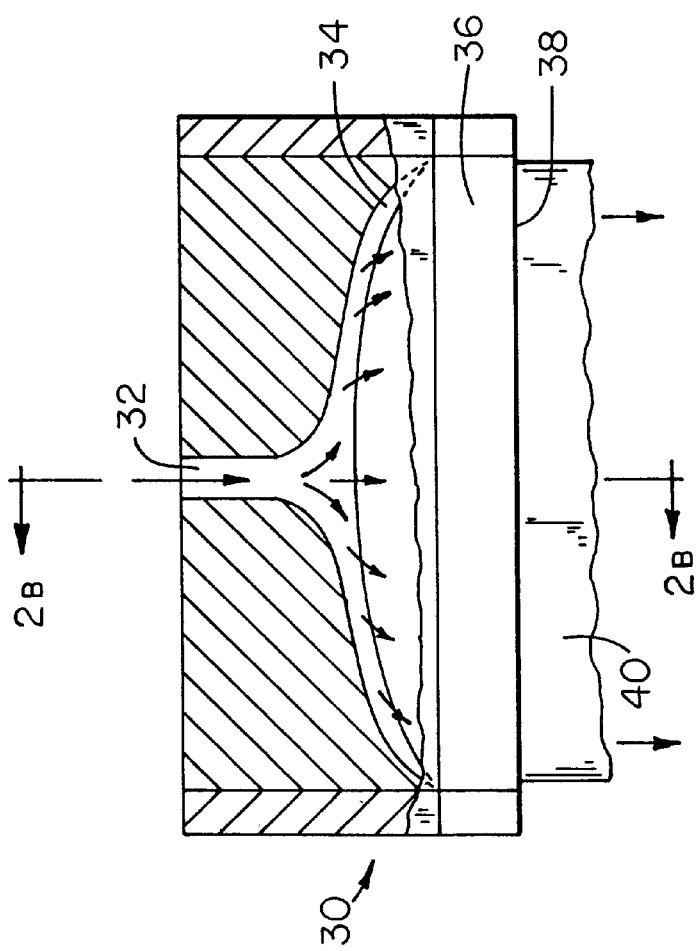
FIG. 2A is a schematic of the polymer flow in a manifold of a flat die utilized in prior art extrusion process for polyester film.

With reference to FIGS. 2A and 2B, the prior art of die extrusion for producing polyester film or sheet utilizes a heated flat die 30. A polyester melt supplied from a screw extruder (not shown) enters the die 30 at the melt inlet 32. The melt is forced to flow uniformly across the width of the die 30 by an internal distribution manifold 34. This uniform flow must continue through the die land 36 and the exit plane 38. The extruded web 40 of hot polymer is quenched on water-cooled rolls 42. Final gauge control may be made by adjusting a die lip.

The present invention of calendering a polyester resin composition has some significant advantages over extrusion of polyesters as a method of film or sheet production. One significant advantage is the retention of inherent viscosity after calendering as compared to prior to calendering. As evident by the data in Table 2, the inherent viscosity of the polyester resin composition is retained at greater than 90 percent, more preferably 95 percent.

Other advantages include high production rates, good thickness control and suitability for long, continuous production runs. For example, modern PVC calendering processes, which would be analogous to the polyester calendering processes of the present invention, produce outputs in excess of 3000 kg/hr and sheets having a thickness tolerance of +/−2% on 0.25 mm thick sheet. The sheets can have widths greater than 2500 mm. This compares quite favorably over a typical sheet extruder for producing polyester film or sheet. The typical extusion process has outputs of 500 to 750 kg/hr, has a thickness tolerance of +/−5% for a 0.25 mm thick sheet and provides a sheet width of 1000 mm. The improved consistency of films or sheets made using the calendering process allows for less set up time and less heating and cycle process adjustments during secondary forming operations. Economic advantages are also evident in terms of conversion cost per kg of sheet achieved by the high output calender processes over extrusion processes.

The present invention thus provides films and sheets made by calendering the polyester resin composition which have an excellent appearance and can be used in a wide range of decorative and packaging applications. The films and sheets are readily thermoformed into various shapes for specific packaging applications for both food and non-food products. They may be printed with a wide variety of inks and may be laminated either in-line or off-line with fabrics or other plastic films or sheets. Some specific end uses would include, graphic arts, transaction cards, security cards, veneers, wall coverings, book bindings, folders and the like.

This invention can be further illustrated by the following examples of preferred embodiments thereof, although it will be understood that these examples are included merely for purposes of illustration and are not intended to limit the scope of the invention unless otherwise specifically indicated.

EXAMPLES 1 TO 7

Polyester compositions A and B are predried at 65° C. for 12 hours in a dehumidified dryer and compounded with various additives as listed in Table 1, using a 30 mm Werner Pfleiderer 40:1 L/D co-rotating twin screw compounding extruder.

TABLE 1

| Material Id | Ex. 1 | Ex. 2 | Ex. 3 | Ex. 4 | Ex. 5 | Ex. 6 | Ex. 7 |
| --- | --- | --- | --- | --- | --- | --- | --- |
| Polyester A[1] | 100.0% | 96.0% | — | 97.0% | 96.5% | 99.0% | 99.0% |
| Polyester B[2] | — | — | 96.0% | — | — | — | — |
| PARALOID K175[3] | — | 2.5% | 2.5% | 2.5% | 2.5% | — | — |
| IRGANOX 1010/DSTDP[4] | — | 0.5% | 0.5% | 0.5% | — | 0.5% | 0.5% |
| MYVEROL 1806[5] | — | 1.0% | 1.0% | — | 1.0% | — | — |
| Zn Stearate[6] | — | — | — | — | — | 0.5% | — |
| KENAMIDE S[7] | — | — | — | — | — | — | 0.5% |

TABLE 1-continued

| Material Id | Ex. 1 | Ex. 2 | Ex. 3 | Ex. 4 | Ex. 5 | Ex. 6 | Ex. 7 |
| --- | --- | --- | --- | --- | --- | --- | --- |

[1])Polyester A: Polyester containing an acid component of 100 mole % terephthalic acid and a glycol component of 31 mole % 1,4-cyclohexanedimethanol and 69 mole % ethylene glycol
[2])Polyester B: Polyester containing an acid component of 100 mole % terephthalic acid and a glycol component of 3.5 mole % 1,4-cyclohexanedimethanol and 96.5 mole % ethylene glycol.
[3])PARALOID K175 is an acrylic-processing additive available from Rohm & Haas.
[4])This is a mixture of IRGANOX 1010, which is a phenolic stabilizer available from Ciba-Geigy AG, and DSTDP, which is a distearyl thiodipropionate commonly available in the industry. The mixture is 0.3% the former and 0.2% the latter.
[5])MYVEROL 1806 is a glycerol monostearate available from Eastman Chemical Company of Kingsport, TN, which is used as an internal lubricant
[6])Zn Stearate is used as a slip additive.
[7])KENAMIDE S is a fatty acid amide available from Witco Corporation, which is used as a slip additive.

The extruded compositions are then re-dried at 65° C. for 8 hrs and sealed in metal lined bags to prevent moisture absorption. The compositions are then calendered into films having a thickness of 0.2 mm using an automated measuring roll mill available from Dr. Collin Gmbh of Ebersberg, Germany at a set roll temperature of 165° C. Bearing force exerted on the rolls, roll torque, calenderability, weight average molecular weight, and polymer crystallinity are measured and summarized in Table 2 and FIGS. 3 to 5.

TABLE 2

| Material Id | Ex. 1 | Ex. 2 | Ex. 3 | Ex. 4 | Ex. 5 | Ex. 6 | Ex. 7 |
| --- | --- | --- | --- | --- | --- | --- | --- |
| IV of Compounded Pellets | 0.7 | 0.75 | 0.74 | 0.73 | 0.75 | 0.73 | 0.71 |
| IV after Calendering | — | 0.74 | 0.73 | — | 0.74 | 0.74 | — |
| Weight average molecular wt by GPC of Pellets | — | 40824 | — | — | 40824 | 37857 | — |
| Weight average molecular wt by GPC of calendered sheet. | — | 40163 | — | — | 40054 | 37792 | — |
| % Crystallinity-Pellets | — | — | 10.8 | — | — | — | — |
| % Crystallinity-Calendered | — | 0 | 31.7 | — | 0 | 0 | — |
| Calenderability | No* | Yes | No** | No* | Yes | Yes | No* |

Figure 3:
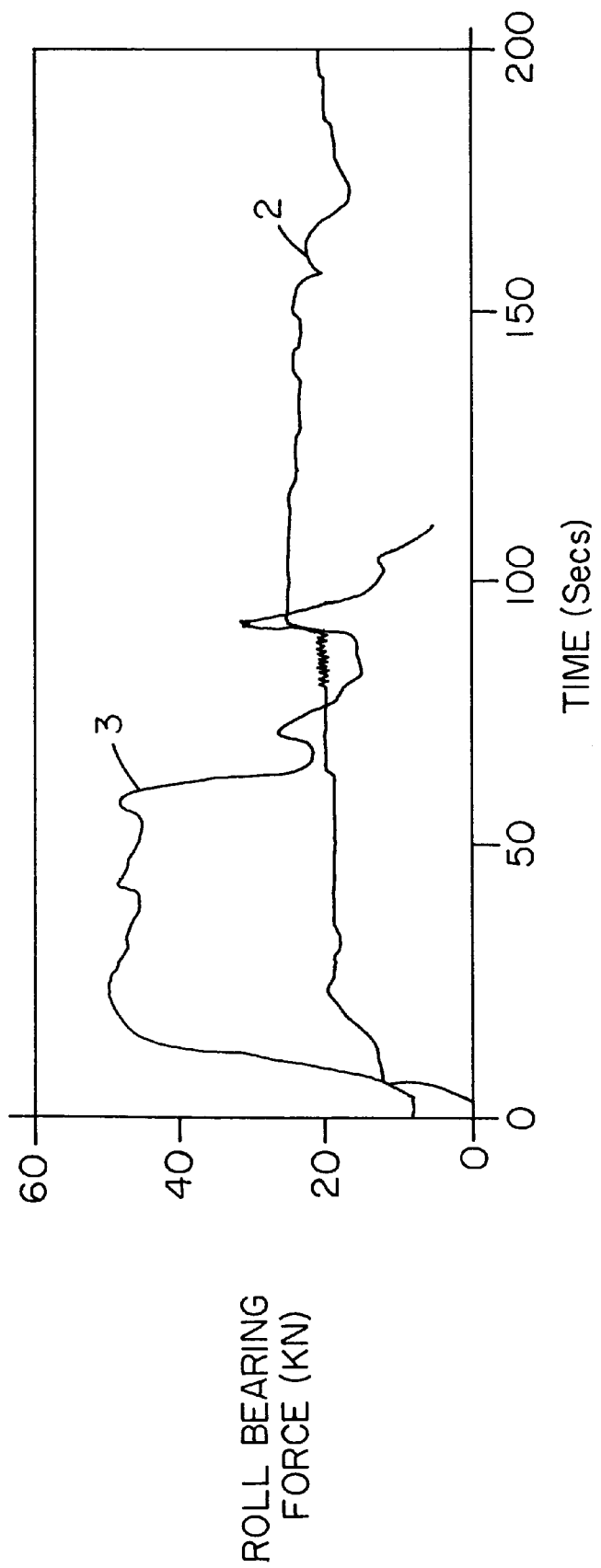
FIG. 3 is a graph showing roll-bearing force per time for Examples 2 and 3.

*Excessive sticking to the calender rolls-not possible to strip the film
**Crystallization in the calender rolls prevents formation of a molten film FIG. 3 shows the role bearing force per time for Examples 2 and 3. The composition of Example 2 exhibited good calenderability evidenced by the stable roll bearing force over time. Example 2 had a crystallization half time of infinity. The composition of Example 3 readily crystallized between the heated rolls resulting in a high force being exerted on the roll bearings, thus being unsuitable for calendering. Example 3 had a crystallization half time of less than 5 minutes.

Figure 4:
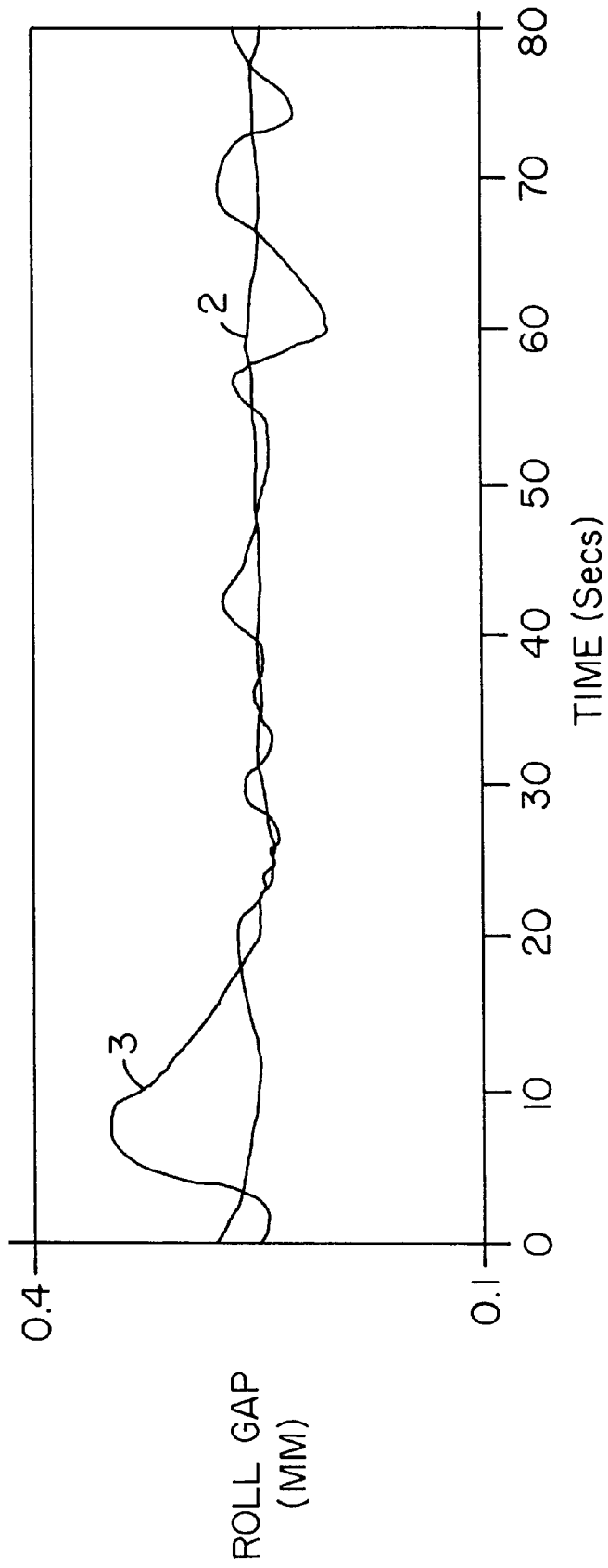
FIG. 4 is a graph showing roll gap per time for Examples 2 and 3.

FIG. 4 shows roll gap per time for Examples 2 and 3. Example 2 calendered at a set roll gap. However, Example 3 had morphology changes associated with crystallization, which created forces causing the rolls to separate.

Figure 5:
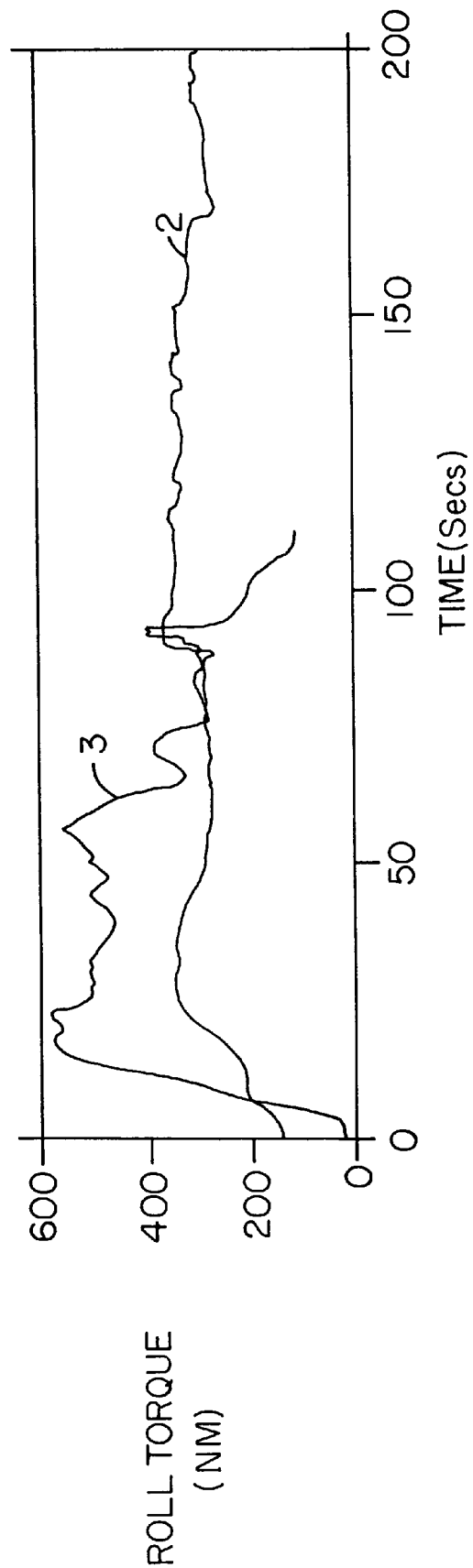
FIG. 5 is a graph showing roll torque per time for Examples 2 and 3.

FIG. 5 shows roll torque per time for Examples 2 and 3. Example 2 had consistent roll torque and uniform calender behavior. Example 3 had inconsistent torque prior to discharge from the rolls.

Examples 1–7 demonstrated the feasibility of calendering polyesters. Polyester A was an amorphous polyester having a crystallization half time of infinity. Polyester B has a crystallization half time of less than 5 minutes and was not readily calendered.

EXAMPLE 8

Using the compounding procedure of Ex. 1, a polyester containing an acid component of 100 mole % terephthalic acid and a glycol component of 12 mole % 1,4-cyclohexanedimethanol and 88 mole % ethylene glycol (I.V. of 0.74) was compounded with 1.0 weight % zinc stearate and 1.0 weight % MYVEROL 1806. The material was heated to its molten state of 260° C. and then transferred to a hot roll mill calender. The copolyester was calendered through compressive nips on the calender rolls to a final sheet thickness of 0.65 mm. This example demonstrated the feasibility of calendering a polyester having a crystallization half time of 12 minutes.

We claim:

1. A polyester resin composition for calendering comprising (a) a polyester having a crystallization half time from a molten state of at least 5 minutes and (b) an additive for preventing sticking of the polyester to calendering rolls.

2. The polyester resin composition of claim 1 wherein the crystallization half time of the polyester is at least 12 minutes.

3. The polyester resin composition of claim 1 wherein the polyester is amorphous having a crystallization half time of infinity.

4. The polyester resin composition of claim 1 wherein the polyester comprises (i) at least 80 mole percent of a diacid residue component selected from terephthalic acid, naphthalenedicarboxylic acid, 1,4-cyclohexanedicarboxylic acid, isophthalic acid and mixtures thereof and (ii) at least 80 mole percent of a diol residue component selected from diols containing 2 to about 10 carbon atoms and mixtures thereof, wherein the diacid residue component is based on 100 mole percent and the diol residue component is based on 100 mole percent.

5. The polyester resin composition of claim 4 wherein the diol residue component is selected from ethylene glycol, neopentyl glycol, diethylene glycol, 1,4-cyclohexanedimethanol, and mixtures thereof.

6. The polyester resin composition of claim 4 wherein the diol residue component comprises from about 10 to about 100 mole percent 1,4-cyclohexanedimethanol and from 90 to about 0 mole percent ethylene glycol.

7. The polyester resin composition of claim 1 wherein the additive is an internal lubricant, a slip agent or a mixture thereof.

8. The polyester resin composition of claim 1 further comprising (c) an oxidative stabilizer.

9. The polyester resin composition of claim 1 further comprising (d) a melt strength enhancer.

10. A process for preparing a film or a sheet comprising the step of calendering a polyester resin composition comprising (a) a polyester having a crystallization half time from a molten state of at least 5 minutes and (b) an additive for preventing sticking of the polyester to calendering rolls.

11. The process of claim 10 wherein the step of calendering, the polyester resin composition is passed through a compressive nip between at least two calendering rolls at temperatures of about 130° C. to about 250° C.

12. The process of claim 10 wherein the step of calendering, the polyester resin composition is passed through a compressive nip between at least two calendering rolls at temperatures of about 140° C. to about 190° C.

13. The process of claim 10 wherein prior to the step of calendering, the polyester resin composition is in molten, pellet or powder forms.

14. The process of claim 10 wherein the crystallization half time of the polyester is at least 12 minutes.

15. The process of claim 10 wherein the polyester is amorphous having a crystallization half time of infinity.

16. The process of claim 10 wherein the polyester comprises (i) at least 80 mole percent of a diacid residue component selected from terephthalic acid, naphthalenedicarboxylic acid, 1,4-cyclohexanedicarboxylic acid, isophthalic acid and mixtures thereof and (ii) at least 80 mole percent of a diol residue component selected from diols containing 2 to about 10 carbon atoms and mixtures thereof, wherein the diacid residue component is based on 100 mole percent and the diol residue component is based on 100 mole percent.

17. The process of claim 16 wherein the diol residue component is selected from ethylene glycol, neopentyl glycol, diethylene glycol, 1,4-cyclohexanedimethanol, and mixtures thereof.

18. The process of claim 16 wherein the diol residue component comprises from about 10 to about 100 mole percent 1,4-cyclohexanedimethanol and from 90 to about 0 mole percent ethylene glycol.

19. The process of claim 10 wherein the additive is an internal lubricant, a slip agent or a mixture thereof.

20. The process of claim 10 wherein prior to the step of calendering, an oxidative stabilizer is added.

21. The process of claim 10 wherein prior to the step of calendering, a melt strength enhancer is added.

22. The film or sheet of claim 10 wherein the polyester resin composition has an inherent viscosity retention of greater than 90 percent after calendering as compared to prior to calendering.

23. The process of claim 22 wherein the viscosity retention is greater than 95 percent.

24. A film or sheet made by a process comprising the step of calendering a polyester resin composition comprising (a) a polyester having a crystallization half time from a molten state of at least 5 minutes and (b) an additive for preventing sticking of the polyester to calendering rolls.

25. The film or sheet of claim 24 wherein the step of calendering, the polyester composition is passed through a compressive nip between at least two calendering rolls at temperatures of about 130° C. to about 250° C.

26. The film or sheet of claim 24 wherein the crystallization half time of the polyester is at least 12 minutes.

27. The film or sheet of claim 24 wherein the polyester is amorphous having a crystallization half time of infinity.

28. The film or sheet of claim 24 wherein the polyester comprises (i) at least 80 mole percent of a diacid residue component selected from terephthalic acid, naphthalenedicarboxylic acid, 1,4-cyclohexanedicarboxylic acid, isophthalic acid and mixtures thereof and (ii) at least 80 mole percent of a diol residue component selected from diols containing 2 to about 10 carbon atoms and mixtures thereof, wherein the diacid residue component is based on 100 mole percent and the diol residue component is based on 100 mole percent.

29. The film or sheet of claim 28 wherein the diol residue component is selected from ethylene glycol, neopentyl glycol, diethylene glycol, 1,4-cyclohexanedimethanol, and mixtures thereof.

30. The film or sheet of claim 28 wherein the diol residue component comprises from about 10 to about 100 mole percent 1,4-cyclohexanedimethanol and from 90 to about 0 mole percent ethylene glycol.

31. The film or sheet of claim 28 wherein the polyester resin composition has an inherent viscosity retention of greater than 90 percent after calendering as compared to prior to calendering.

32. The process of claim 31 wherein the viscosity retention is greater than 95 percent.

* * * * *